United States Patent
Molitor et al.

(10) Patent No.: US 10,651,783 B2
(45) Date of Patent: May 12, 2020

(54) SOLAR MODULE AND SOLAR MODULE FRAME

(71) Applicant: HANWHA Q CELLS GMBH, Bitterfeld-Wolfen (DE)

(72) Inventors: Heiko Molitor, Leipzig (DE); Henning Busse, Leipzig (DE); Marc Dewenter, Halle (DE); Thomas Ebenroth, Bitterfeld-Wolfen (DE)

(73) Assignee: HANWHA Q CELLS GMBH, Bitterfeld-Wolfen (DE)

( * ) Notice: Subject to any disclaimer, the term of this patent is extended or adjusted under 35 U.S.C. 154(b) by 0 days.

(21) Appl. No.: 15/375,008

(22) Filed: Dec. 9, 2016

(65) Prior Publication Data
US 2017/0170778 A1    Jun. 15, 2017

(30) Foreign Application Priority Data
Dec. 11, 2015   (DE) .......................... 10 2015 121 615

(51) Int. Cl.
*H02S 30/10*   (2014.01)
*F24S 25/20*   (2018.01)

(52) U.S. Cl.
CPC .............. *H02S 30/10* (2014.12); *F24S 25/20* (2018.05); *Y02E 10/47* (2013.01)

(58) Field of Classification Search
CPC .................................. H02S 30/10; F24S 25/20
See application file for complete search history.

(56) References Cited

U.S. PATENT DOCUMENTS

| 2,869,694 | A | * | 1/1959 | Breckheimer | B01D 46/10 |
| | | | | | 52/658 |
| 4,084,720 | A | * | 4/1978 | Thurston | B65D 15/22 |
| | | | | | 206/566 |
| 4,392,009 | A | | 7/1983 | Napoli | |
| 4,433,200 | A | * | 2/1984 | Jester | H01L 31/048 |
| | | | | | 136/244 |
| 4,479,737 | A | * | 10/1984 | Bergh | B65D 55/02 |
| | | | | | 220/690 |

(Continued)

FOREIGN PATENT DOCUMENTS

| CN | 102891212 A | 1/2013 |
| CN | 102892962 A | 1/2013 |
| DE | 102009059232 A1 | 6/2011 |

*Primary Examiner* — Paola Agudelo
(74) *Attorney, Agent, or Firm* — Christensen, Fonder, Dardi & Herbert PLLC

(57) ABSTRACT

A solar module having a solar module laminate and a rectangular solar module frame which supports the solar module laminate and is assembled by frame profiles which are respectively connected to each other by pairs to a corner connection, wherein at least one of the corner connections is formed by connection of a first frame profile of the frame profiles to an adjacent second frame profile of the frame profiles by a flap. Further, the invention relates to a solar module frame designed to support a solar module laminate and assembled by frame profiles which are respectively connected to each other by pairs to a corner connection, wherein at least one of the corner connections is formed by connection of a first frame profile of the frame profiles to an adjacent second frame profile of the frame profiles by means of a flap.

6 Claims, 4 Drawing Sheets

(56) References Cited

U.S. PATENT DOCUMENTS

| | | | |
|---|---|---|---|
| 7,418,806 B2* | 9/2008 | Martineau | B29C 65/14 52/656.9 |
| 7,487,771 B1* | 2/2009 | Eiffert | F24J 2/5211 126/621 |
| 8,499,523 B2* | 8/2013 | Sawyers | E06B 9/52 52/204.1 |
| 8,806,816 B2* | 8/2014 | Brodam | F24J 2/4614 52/177 |
| 8,869,494 B2* | 10/2014 | Mader | E06B 3/66328 52/204.591 |
| 2006/0215396 A1* | 9/2006 | Shin | F24J 2/5233 362/153 |
| 2010/0154327 A1* | 6/2010 | Reyal | H01L 31/02008 52/173.3 |
| 2010/0243035 A1* | 9/2010 | Nakamura | F24J 2/5211 136/251 |
| 2011/0011446 A1* | 1/2011 | Hirayama | F24J 2/4614 136/251 |
| 2011/0155127 A1* | 6/2011 | Li | F24J 2/5211 126/704 |
| 2012/0222726 A1* | 9/2012 | Qin | H01L 31/02008 136/251 |
| 2013/0014809 A1* | 1/2013 | Sagayama | F24J 2/5205 136/251 |
| 2013/0019857 A1* | 1/2013 | Li | H01L 31/0424 126/569 |
| 2013/0112247 A1* | 5/2013 | Li | F24J 2/5211 136/251 |
| 2014/0352763 A1* | 12/2014 | Chen | F24J 2/5211 136/251 |
| 2015/0083220 A1* | 3/2015 | Pardell Vilella | H01L 31/048 136/259 |
| 2015/0107651 A1* | 4/2015 | Cinnamon | H02S 40/36 136/251 |
| 2015/0188485 A1* | 7/2015 | Okuda | H02S 30/10 136/259 |
| 2015/0194557 A1* | 7/2015 | Williams | H02S 40/44 136/248 |
| 2015/0256121 A1* | 9/2015 | Kube | H02S 20/10 136/251 |
| 2015/0295534 A1* | 10/2015 | Maruyama | H02S 30/10 136/251 |
| 2015/0372637 A1* | 12/2015 | Wu | H02S 30/10 136/251 |
| 2016/0134231 A1* | 5/2016 | Wu | C08L 23/16 136/251 |
| 2016/0190978 A1* | 6/2016 | Domaleski | H02S 20/30 136/251 |

* cited by examiner

SOLAR MODULE AND SOLAR MODULE FRAME

PRIORITY CLAIM

The present application claims priority to German Patent Application No. 102015121615.9, filed on Dec. 11, 2015, which said application is incorporated by reference in its entirety herein.

FIELD OF THE INVENTION

The invention relates to a solar module and a solar module frame.

BACKGROUND OF THE INVENTION

Generally, a solar module has a solar module laminate in the form of a laminate panel having a front side and a rear side and a solar module frame. The solar module frame serves to increase the stability of the solar module, to enhance the protection of the borders of the solar module laminate and to allow an easier mounting of the solar module, for example on a roof girder construction.

Generally, the laminate panel employed is designed as a glass plate having a layer system of solar cells connected electrically to each other and encapsulated durably in weatherproof manner. The solar module laminate has a glass panel on which solar cells connected electrically to each other are arranged as so-called strings which are masked by a durably weather-proof plastic foil. The glass panel forms the front side of the solar module laminate, and the weather-proof plastic foil forms the solar module laminate rear side.

SUMMARY

In the scope of this invention, the laminate layer construction of glass panel, solar cell strings, embedding polymers and weather-proof plastic foil which does not belong to the frame construction is designated as solar module laminate. The combination of the solar module laminate with the solar module frame formed by frame profiles is designated as solar module.

The difference between the terms solar module and solar module laminate is that the solar module when compared to the solar module laminate has additionally a frame construction as solar module frame and, if required, adhesive means and/or clamping means for gluing and clamping the frame construction to the solar module laminate or other fastening and/or connection means.

For example, in the DE 10 2015 103 712 which is not published yet is described a solar module having a solar module frame. The solar module frame has four frame profiles which are connected to each other by corner connectors. The frame profiles are joined with a cutting angle of 90° and face covering elements serve to cover exposed ends of the frame profiles. Due to the plurality of parts material costs are high and production steps are time-consuming and costly. Further, the weight of the solar module and the solar module frame is increased by the additional elements such as face covering elements and corner connectors.

It is an object of the invention to provide a solar module and a solar module frame which are easier to build up and more cost-effective in production.

According to the invention, the object is solved by a solar module having the features of claim 1 and by a solar module frame having the features of claim 8. Advantageous modifications and embodiments of the invention result from the dependent claims.

The invention relates to a solar module having a solar module laminate and a rectangular solar module frame which supports the solar module laminate and is assembled by frame profiles which are respectively connected to each other by pairs to a corner connection, wherein at least one of the corner connections is formed by connection of a first frame profile of the frame profiles to an adjacent second frame profile of the frame profiles by means of a flap. Preferably, the corner connection is designed at a frame corner of the solar module frame. Preferably, the solar module frame is assembled by three, four or more frame profiles.

This solar module has increased module stiffness by optimized design of the profile cross-section at the respective frame profile sides. Further, material costs can be saved because materials such as the corner connectors are omitted. Furthermore, the solar module can be produced in an easy manner, its production has few process steps. Thus, installation effort is low. Furthermore, the solar module frame can have different profile cross-sections having different material wall thicknesses. The frame geometry is optimized.

The material of the solar module frame can be aluminum or preferably steel. Further, costs can be saved by using steel instead of aluminum. Furthermore, the module stiffness is enhanced further through this.

Preferably, the frame profiles are designed in an elongated manner. Preferably, the flap is designed at an end of the first or second frame profile, respectively, and preferably extends vertically or substantially vertically to a longitudinal elongation of the first or second frame profile, respectively. The solar module has low material and production costs.

The corner connection can be designed at an end of the first frame profile and/or an end of the second frame profile. In particular, that means that the corner connection can be designed also at a central region of the second frame profile. In that case the first frame profile and the second frame profile form a T-shaped connection. If the solar module frame is assembled by only three frame profiles, it can have a H-shape, wherein a central frame profile makes respectively a corner connection to two further frame profiles. Even if the solar module frame is assembled by four frame profiles, one or two frame profiles parallel to each other can be offset inwards compared to outer contours or frame borders of the solar module, respectively, or compared to corresponding borders of the solar module laminate and form in extreme case a H-shaped solar module frame.

Thus, the frame profiles of the solar module frame can be connected to each other to altogether two, three, four or more corner connections. Here, one single frame profile can form simultaneously the first frame profile in a first corner connection and the first frame profile in a second corner connection, if the flap is assigned only to the first frame profile in the respective corner connection. In that case said frame profile has at both ends a flap. Alternatively, one single frame profile can form the first frame profile in a first corner connection and the second frame profile in a second corner connection. In that case said frame profile has only at one of its ends a flap.

As explained preliminarily, the solar module laminate can be a so-called glass-plastic laminate which is enclosed at front side by a glass panel and at rear side by a plastic foil. Alternatively, it can be a glass-glass-laminate, wherein the solar cells or the solar cell strings, respectively, are enclosed between a front side glass panel or glass plate and a rear side glass panel or glass plate, wherein the solar cells are embedded in a polymer again here.

Preferably, the solar module frame surrounds the solar module laminate. In particular, the solar module frame can surround partially the solar module laminate, for example, by covering partially or completely two or more borders of the solar module laminate by corresponding frame profiles. Preferably, the solar module frame surrounds completely the solar module laminate. That means that all of the borders of the solar module laminate are covered by corresponding frame profiles so that the solar module frame frames completely the solar module laminate. Preferably, the frame profiles are designed as elongated frame profiles extending along the borders of the laminate plate. Several frame profiles can be connected to each other along a border. Preferably, a first frame profile connected at corners of the laminate plate to adjacent second frame profiles extends along a border. Alternatively, the corner connection can also be designed in a region underneath the solar module laminate. Preferably, the solar module laminate is designed rectangular and one frame profile extends respectively along a border of the laminate plate and is connected to the adjacent frame profiles at the corners of the laminate plate by a respective flap.

If the solar module laminate is a rectangle but not a square, the solar module laminate has two longitudinal sides and two transverse sides. If the solar module laminate has two long sides as longitudinal sides and two short sides as transverse sides, wherein the terms "short" and "long" are used in a relative manner to each other, it is surrounded by two short and two long frame profiles. The short frame profile can be the first frame profile, and the long frame profile can be the second frame profile or vice versa.

Preferably, all of the four corner connections are each designed by means of a flap. In a preferred embodiment one respective flap is designed at one respective end of each frame profile, while the other end of each frame profile is flap-free, i.e., has no flap. Alternatively preferred, the first frame profile has respectively at both ends a flap, while the second adjacent frame profile is designed flap-free, a third frame profile adjacent the second frame profile has respectively at both ends a flap, and a fourth frame profile adjacent the first and third frame profile is designed flap-free again.

In a preferred embodiment the first frame profile and/or the second frame profile encompass partially or completely a border of the solar module laminate. The first and/or second frame profile has when seen in cross-section a receiving section for receiving the laminate plate. For example, the receiving section is designed as two protrusions which extend in the direction of the laminate plate and are spaced apart from each other so that the laminate plate is fitted between them and which extend along edge regions and the borders of the laminate plate. The receiving section is designed in U-shape when seen in cross-section and formed by means of two protrusions connected by a connecting section and being opposite each other. They are glued and/or clamped together in sections or completely with borders of the solar module laminate so that the solar module frame encompasses the solar module laminate along its borders.

Preferably, receiving sections of adjacent frame profiles, i.e., if the first and the second frame profile have a receiving element, are arranged in flush manner to each other. In that embodiment the stability and the torsional stiffness of the solar module laminate are increased and/or a mounting possibility is created by the frame construction and/or a border protection for the solar module laminate is ensured.

Preferably, the first frame profile has a U- or S-shaped profile cross-section. Alternatively or additionally, the second frame profile has preferably a U- or S-shaped profile cross-section. More preferably, the first frame profile has a U-shaped profile cross-section. Alternatively or additionally, the second frame profile has a U-shaped profile cross-section. Preferably, the solar module frame has a first S-shaped frame profile and a second S-shaped frame profile. Alternatively preferred, the solar module frame has a first (or second) S-shaped frame profile and a second (or first) U-shaped frame profile. Preferably, the U-shaped frame profile has no U-shaped receiving section for encompassing the solar module laminate, rather the U-shaped profile cross-section is designed to support the solar module laminate by resting on the U-shaped frame profile. In the last case the solar module laminate can be glued together with a bearing surface of the U-shaped frame profile.

Preferably, the S-shaped frame profile is designed in such a manner that it has the U-shaped receiving section, the so-called laminate notch, into which the solar module laminate is preferably sticked in, and a further U-shaped section, wherein a protrusion is part of the U-shaped receiving section and simultaneously part of the further U-shaped section, i.e., the U-shaped receiving section and the further U-shaped section represent two sections U-shaped sections designed in opposite directions and sharing the above protrusion of the U-shaped receiving section, and thereby, design the S-shape.

If the first frame profile has a S-shaped profile cross-section and the second frame profile has a U-shaped profile cross-section, a height of the U-shaped profile cross-section extending vertically to the longitudinal direction of the U-shaped frame profile is substantially equal or equal to the height of the further U-shaped section of the S-shaped profile cross-section extending vertically to the longitudinal direction of the S-shaped frame profile. Thereby, the solar module laminate can be/is arranged on the U-shaped profile cross-section in resting manner and in encompassed manner by the U-shaped receiving section of the S-shaped profile cross-section so that the solar module laminate is framed by the solar module frame in stable manner without necessarily having been glued.

In a preferred embodiment the flap extends along a flap plane parallel to a longitudinal direction of the second frame profile and rests on a surface of the second frame profile being located in the flap plane. For example, a dimension of the flap can be designed accordingly to the height of the U-shaped profile cross-section or the U-shaped section of the S-shaped profile cross-section of the second frame profile so that the flap is clamped with the second frame profile in fitting manner to the surface.

Preferably, the flap rests on an inner surface of the second frame profile which faces the solar module laminate. Alternatively, the flap rests on an outer surface of the second frame profile which faces away from the solar module laminate.

The first frame profile is made in one piece or by several pieces from a bent metal strip or metal sheet. Further, the flap as integral part of the metal strip or metal sheet is bent out from a plane parallel to the longitudinal direction of the first frame profile. Preferably, the flap is bent out in vertical manner to the plane parallel to the longitudinal direction of the first frame profile. By this configuration the solar module further remains cost-effective and has little parts to be assembled.

In a preferred embodiment the flap is connected to the second frame profile by means of positive material, form-fitting and/or frictional connection. The wording "positive material connection" means that the connecting partners are hold together by atomic or molecular forces. It represents a non-detachable connection which can only be separated by destruction of the connection. Examples for a positive material connection are an adhesive connection, a solder connection or a welding connection. A form-fitting connection is created by engagement of at least two connection partners into each other. In case of a frictional connection the connection partners are connected to each other by means of force closure. A frictional connection is created by transmission of forces such as compressive forces or friction forces. Cohesion of the frictional connection is ensured by the acting force. Examples for a form-fitting or frictional connection, respectively, are a rivet connection, a screw connection, a clinch connection and the like.

Further, the invention relates to a solar module frame designed to support a solar module laminate and assembled by four frame profiles which are respectively connected to each other by pairs at the frame corners to a corner connection, wherein at least one of the corner connections is formed by connection of a first frame profile of the four frame profiles to an adjacent second frame profile of the four frame profiles by means of a flap. The solar module frame has low material and production costs when compared to actual module frames. The frame geometry is optimized in regard to producibility and module requirement. The embodiments and advantages described in relation to the solar module frame of the solar module already described shall apply mutatis mutandis to the solar module frame.

Further characteristics and advantages of the invention are illustrated by exemplary embodiments below described with reference made to the figures. It shows:

DETAILED DESCRIPTION

Figure 1:
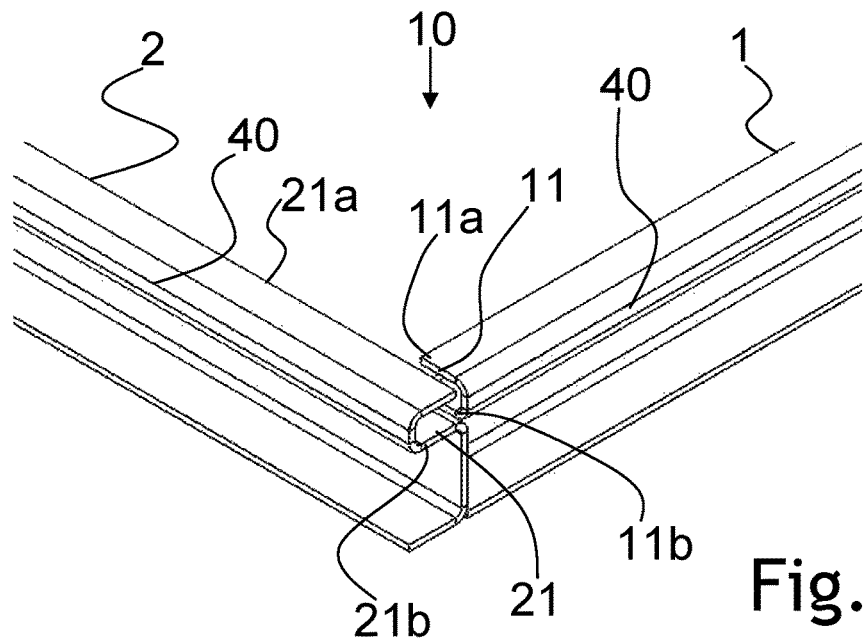
FIG. 1 schematically a partial outer side view on a solar module frame according to an embodiment.

FIG. 1 shows schematically a partial outer side view on a solar module frame according to an embodiment. The outer side view shows laterally from one side a corner connection 10 of the solar module frame. The solar module frame has several frame parts, two of them are shown, namely a first frame profile 1 and a second frame profile 2 which are arranged adjacent and are connected to each other by the corner connection 10. The first frame profile 1 and the second frame profile 2 are designed in elongated manner and each have S-shaped profile cross-section. The first frame profile 1 has a receiving section 11 for receiving a solar module laminate (not shown) and the second frame profile 2 has a receiving section 21 for receiving the solar module laminate which are arranged to each other in flush manner. The receiving sections 11 and 21 each have for receiving the solar module laminate protrusion 11a and 21a, respectively, and further protrusion 11b or 21b, respectively, extending from a rear wall 40 of the first frame profile 1 or second frame profile 2, respectively, in direction to the solar module laminate so that part of the rear wall 40 and the protrusions 11a and 11b or 21a and 21b, respectively, encompass in U-shape the solar module laminate at edge regions and borders.

Figure 2:
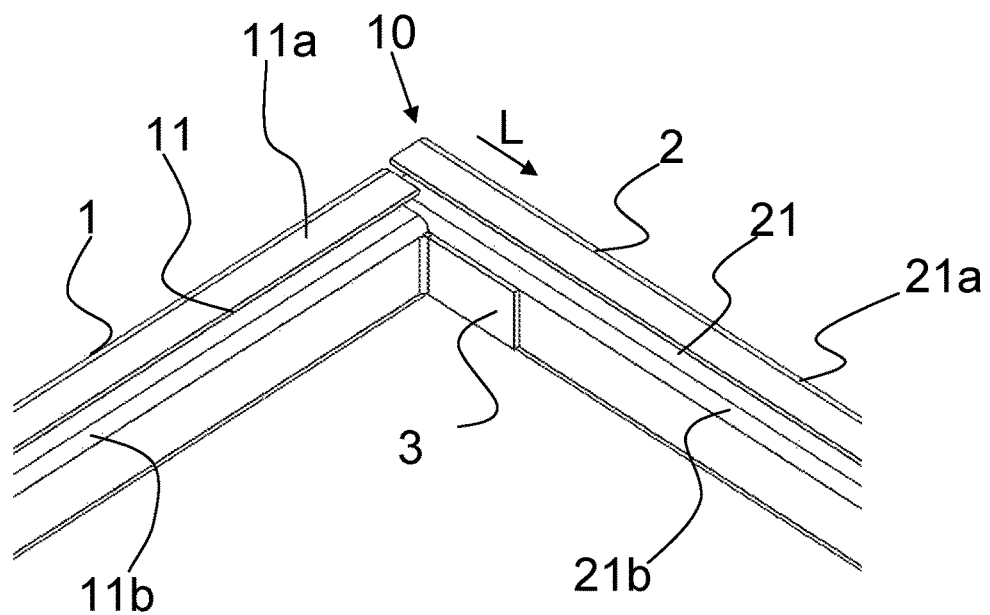
FIG. 2 schematically a partial inner side view on the partial solar module frame shown in FIG. 1.

FIG. 2 shows schematically a partial inner side view on the partial solar module frame shown in FIG. 1. The corner connection 10 is formed by connection of the first frame profile 1 to the adjacent second frame profile 2 by means of a flap 3. The flap 3 extends along a flap plane (not shown) parallel to a longitudinal direction L of the second frame profile 2. The flap 3 rests on an inner surface (not shown) of the second frame profile 2 being located in the flap plane and facing the solar module laminate (not shown). The first frame profile 1 is made from a bent metal strip in one piece, wherein the flap 3 as integral part of the metal strip is bent out of the plane parallel to the longitudinal direction L of the second frame profile 2. The flap 3 is connected to the second frame profile 2 by means of a positive material connection (not shown), for example by means of a glue.

Figure 3:
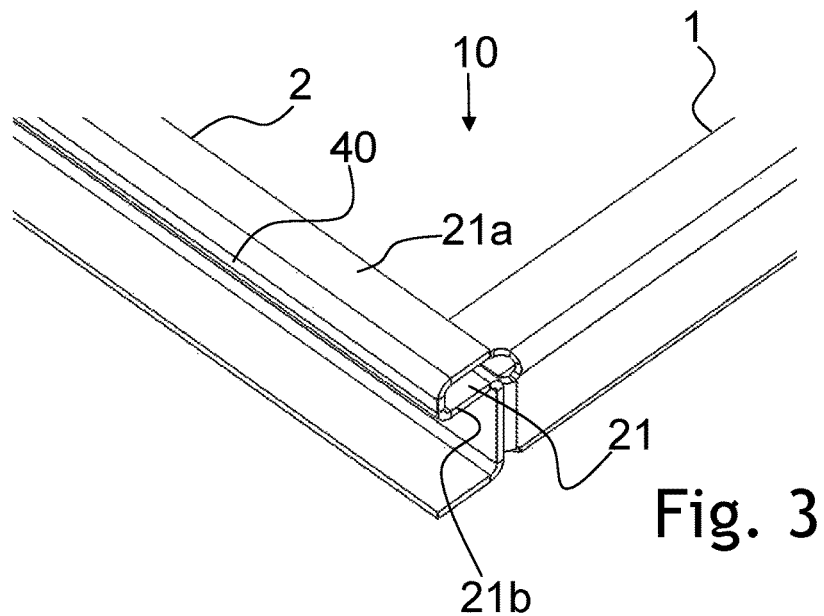
FIG. 3 schematically a partial outer side view on a solar module frame according to another embodiment.

FIG. 3 shows schematically a partial outer side view on a solar module frame according to another embodiment. The embodiment shown in FIG. 3 corresponds to the embodiment shown in FIG. 1 except that the first frame profile has a U-shaped profile cross-section and that it has no receiving section. A solar module laminate (not shown) can be arranged in the solar module frame in such a manner that it rests on the first frame profile 1 and is encompassed from the U-shaped receiving section 21 of the second frame profile.

Figure 4:
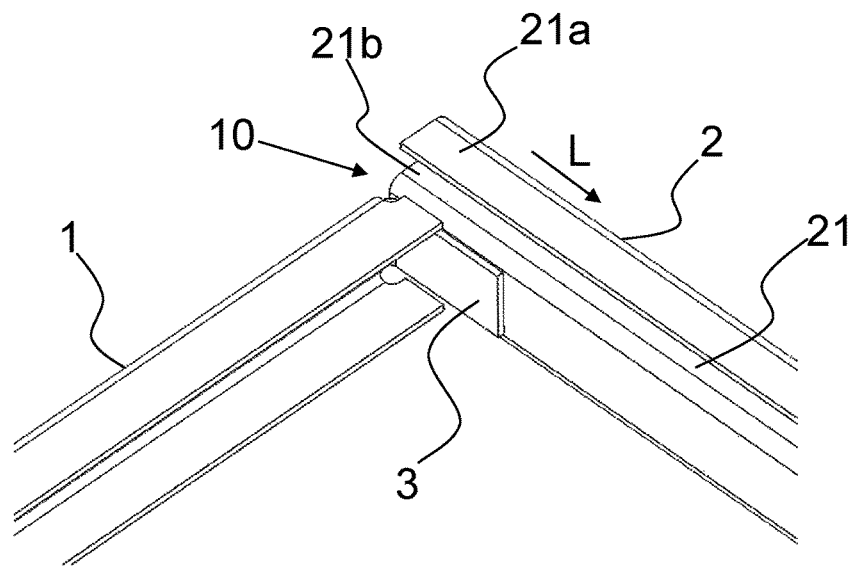
FIG. 4 schematically a partial inner side view on the partial solar module frame shown in FIG. 3.

FIG. 4 shows schematically a partial inner side view on the partial solar module frame shown in FIG. 3. The embodiment shown in FIG. 4 corresponds to the embodiment shown in FIG. 2 except that the first frame profile has a U-shaped profile cross-section and that it has no receiving section.

FIGS. 5a to 5c and 6a to 6c each show schematically a plan view on solar module frame according to different embodiments. Each of the solar module frames 4 shown in these Figures is assembled by four frame profiles, namely an upper frame profile 41, a right frame profile 42, a lower frame profile 43 and a left frame profile 44. Each solar module frame 4 shown is designed rectangular, wherein the upper frame profile 41 and the lower frame profile 43 are each designed shorter than the right frame profile 42 and the left frame profile 44. The frame profiles 41, 42, 43, 44 are connected to each other by pairs at frame corners to a corner connection 10, respectively, wherein the corner connections 10 are formed by connection of one of the four frame profiles 41, 42, 43, 44 to an adjacent frame profile of the frame profiles 41, 42, 43, 44 by means of a flap 3, wherein the flap 3 extends along a flap plane (not shown) parallel to a longitudinal direction (not shown) of an adjacent frame profile 41, 42, 43, 44 and rests on a surface of the adjacent frame profile 41, 42, 43, 44 being located in the flap plane.

Figures 5A, 5B, 5C:
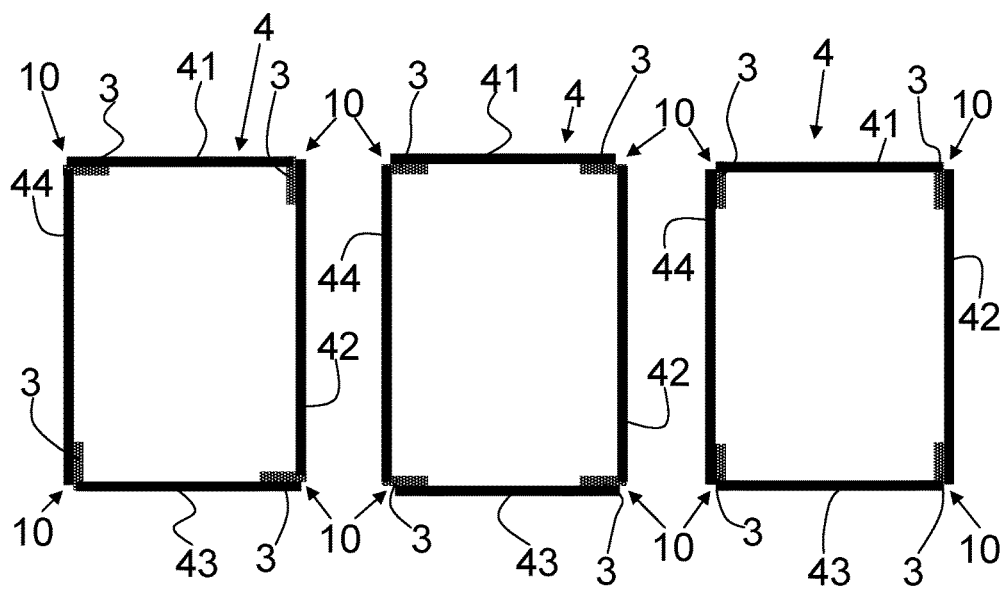
FIGS. 5a to 5c and 6a to 6c each schematically a plan view on solar module frames according to different embodiments.

The solar module frame shown in FIG. 5a has frame profiles 41, 42, 43, 44 each having a flap 3. Each of the flaps 3 rests on an inner surface of the adjacent frame profile 41, 42, 43, 44 facing to a solar module laminate (not shown) surrounded by the solar module frame 4.

The solar module frame 4 shown in FIG. 5b corresponds to the solar module frame shown in FIG. 5a except that the upper frame profile 41 and the lower frame profile 43 do not have a flap 3, respectively, i.e., are flap-free, while the right frame profile 42 and the left frame profile 44 have two flaps 3, respectively, all of which resting on the inner surface of the adjacent frame profile 41, 43 facing to a solar module laminate (not shown) surrounded by the solar module frame 4.

The solar module frame 4 shown in FIG. 5c corresponds to the solar module frame shown in FIG. 5a except that the right frame profile 42 and the left frame profile 44 do not have a flap 3, respectively, i.e., are flap-free, while the upper frame profile 41 and the lower frame profile 43 have two flaps 3, respectively, all of which resting on the inner surface of the adjacent frame profile 42, 44 facing to a solar module laminate (not shown) surrounded by the solar module frame 4.

Figures 6A, 6B, 6C:
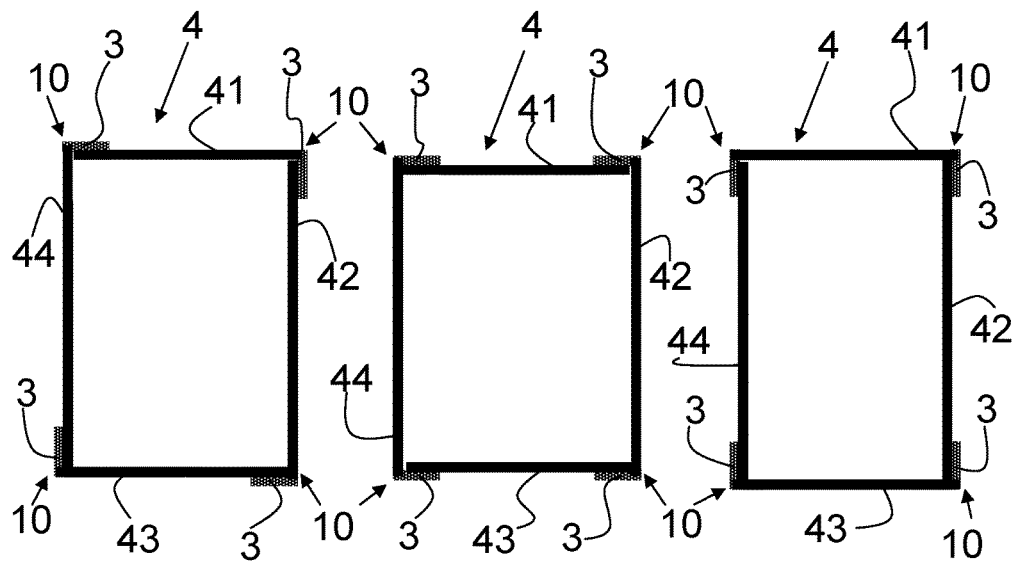

The solar module frame 4 shown in FIG. 6a corresponds to the solar module frame shown in FIG. 5a except that the respective flap 3 of each frame profile 41, 42, 43, 44 rests on an outer surface of the adjacent frame profile 41, 42, 43, 44 facing away from the solar module laminate (not shown) surrounded by the solar module frame 4.

The solar module frame 4 shown in FIG. 6b corresponds to the solar module frame shown in FIG. 5b except that the respective flap 3 of each frame profile 41, 42, 43, 44 rests on an outer surface of the adjacent frame profile 41, 42, 43, 44 facing away from the solar module laminate (not shown) surrounded by the solar module frame 4.

The solar module frame 4 shown in FIG. 6c corresponds to the solar module frame shown in FIG. 5c except that the respective flap 3 of each frame profile 41, 42, 43, 44 rests on an outer surface of the adjacent frame profile 41, 42, 43, 44 facing away from the solar module laminate (not shown) surrounded by the solar module frame 4.

Figure 7:
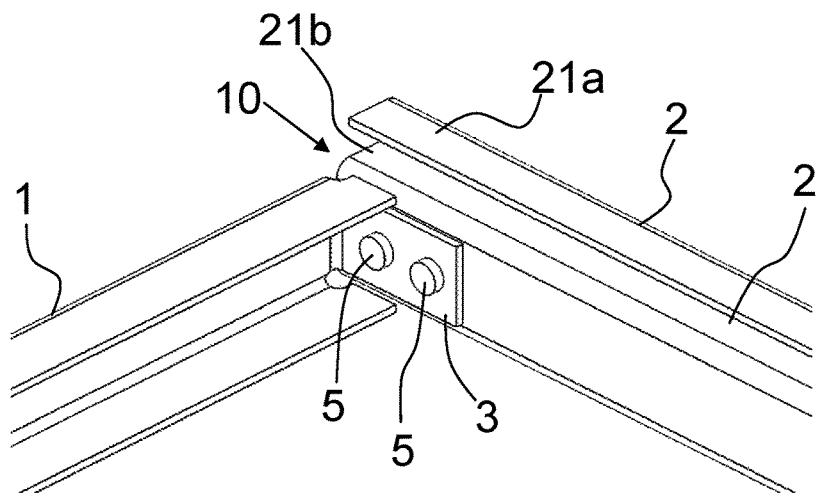
FIG. 7 schematically a partial inner side view on a solar module frame according to a further embodiment.

FIG. 7 shows schematically a partial inner side view on a solar module frame according to a further embodiment. The solar module frame 4 shown in FIG. 7 corresponds to the solar module frame shown in FIG. 4 except that the flap 3 of the first frame profile 1 is connected to the second frame profile 2 by means of a form-fitting or frictional connection, respectively. Each connection 5 represents a round point made by a clinch process. Alternatively, the connections 5 can also be designed as flat joint (not shown).

Figures 8A, 8B:
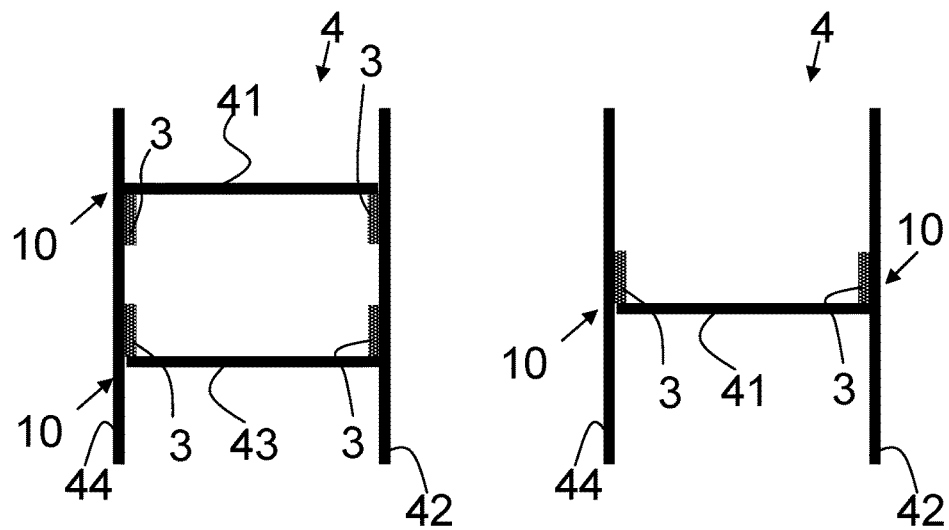
FIGS. 8a and 8b schematically plan views on solar module frames according further embodiments having frame profiles offset inwards.

FIG. 8a shows a solar frame module 4 made of four frame profiles 41, 42, 43, 44 which are connected to each other by pairs by means of corner connections. As in the embodiments of FIGS. 5a to 5c explained above the flaps rest here again on inner surfaces of adjacent frame profiles 41, 42, 43, 44. However, they can also rest on the outer surfaces of the adjacent frame profiles 41, 42, 43, 44 as illustrated in FIGS. 6a to 6c. However, in different way from illustration in FIGS. 5a to 5c two parallel frame profiles, namely the upper frame profile 41 and the lower frame profile 43 are offset inwards in parallel manner when compared to an outer contour of the solar module frame 4. In the solar module frame 4 shown in FIG. 8b the upper frame profile 41 is offset further into the center of the solar module frame 4 and the lower frame profile 43 is saved entirely. Thus, the solar module frame 4 shown in FIG. 8b is assembled by merely three frame profiles 41, 43, 44 connected to each other by means of two corner connections 10.

REFERENCE LIST 1 first frame profile
10 corner connection
11 receiving section
11a, 11b protrusion
12 second frame profile
2 receiving section
21a, 21b protrusion
3 flap
4 solar module frame
40 rear wall
41 upper frame profile
42 right frame profile
43 lower frame profile
44 left frame profile
5 connection
L longitudinal direction

The invention claimed is:

1. A solar module, comprising:
a solar module laminate and a rectangular solar module frame which supports the solar module laminate and is assembled by frame profiles which are respectively connected to each other by pairs at a corner connection,
wherein at least one of the corner connections is formed by connection of a first frame profile of the frame profiles to an adjacent second frame profile of the frame profiles by a flap that includes a first surface facing in a longitudinal direction and a second surface facing in a direction opposite the first surface,
wherein the first frame profile comprises a first elongated portion extending in the longitudinal direction and the flap, and wherein the flap extends out of a plane parallel to the longitudinal direction of the first elongated portion, and the flap is integrally formed with the first elongated portion, such that the first elongated portion and the integrally-formed flap form a one-piece, unitary frame profile,
wherein the second frame profile comprises a second elongated portion extending in a direction transverse to the first frame profile, the second elongated portion includes a frame-profile surface,
wherein an entirety of the first surface of the flap is adjacent to the frame-profile surface of the second elongated portion, the second surface of the flap is exposed and not covered by the second frame profile, and the flap is connected to the second frame profile by a positive material and/or a form-fitting connection.

2. The solar module according to claim 1, wherein the solar module frame surrounds the solar module laminate.

3. The solar module according to claim 1, wherein the first frame profile and/or the second frame profile encompass partly or completely a border of the solar module laminate.

4. The solar module according to claim 1, wherein the first frame profile has a U-shaped profile cross-section and/or the second frame profile has a S-shaped profile cross-section.

5. The solar module according to claim 1, wherein the frame-profile surface of the second frame profile faces the solar module laminate.

6. A solar module frame designed to support a solar module laminate and assembled by frame profiles which are respectively connected to each other by pairs at frame corners at a corner connection, wherein at least one of the corner connections is formed by connection of a first frame profile of the frame profiles to an adjacent second frame profile of the frame profiles by a flap that includes a first surface facing in a longitudinal direction and a second surface facing in a direction opposite the first surface, wherein the first frame profile comprises a first elongated portion extending in a longitudinal direction and the flap, and wherein the flap extends out of a plane parallel to the longitudinal direction of the first elongated portion, and the flap is integrally formed with the first elongated portion, such that the first elongated portion and the integrally-formed flap form a one-piece, unitary frame profile,
   wherein the second frame profile comprises a second elongated portion extending in a direction transverse to the first frame profile, the second elongated portion includes a frame-profile surface,
   wherein an entirety of the first surface of the flap is adjacent to the frame-profile surface of the second elongated portion, the second surface of the flap is exposed and not covered by the second frame profile, and the flap is connected to the second frame profile by a positive material and/or a form-fitting connection.

* * * * *